United States Patent

[11] 3,622,346

[72] Inventor: Max Winter, Petit-Lancy, Geneva, Switzerland
[21] Appl. No.: 760,341
[22] Filed: Sept. 17, 1968
[45] Patented: Nov. 23, 1971
[73] Assignee: Firmenich & Cie, Geneva, Switzerland
[32] Priority: Feb. 26, 1963
[33] Switzerland
[31] 2415/63
Continuation-in-part of application Ser. No. 661,485, June 26, 1967, now abandoned, Original application Feb. 21, 1964, Ser. No. 346,420, now Patent No. 3,328,402. Divided and this application Sept. 17, 1968, Ser. No. 760,341

[54] PYRAZINE DERIVATIVES AS NUTLIKE FLAVORING AGENTS AND METHOD OF USE
20 Claims, No Drawings

[52] U.S. Cl. ................................. 99/140 R
[51] Int. Cl. ................................. A23l 1/22
[50] Field of Search ........................ 99/1, 23, 28, 54, 59, 86, 118, 126, 134, 136, 139, 140; 260/250

[56] References Cited
UNITED STATES PATENTS
3,328,402  6/1967  Winter ............... 260;99/250;40 X

OTHER REFERENCES

Klein et al., "Pyrazines. IV. Nucleophilic Substitutions on Chloropyrazine & Alkyl Chloropyrazine N-oxides" J. Org. Chem. 29(9), 2623– 2626 (1964).

Baxter et al., J. Chem. Soc. London (1948) pages 1859– 1860 QD1 C6

Hirchberg et al., J. Org. Chem. Volume 26 (1961) pages 2356– 2360 QD 241.J6

Primary Examiner—Morris O. Wolk
Assistant Examiner—Warren Bovee
Attorney—Pennie, Edmonds, Morton, Taylor and Adams ABSTRACT: A flavoring agent, a method for imparting to foodstuffs and beverages the flavor and taste similar to that of roasted hazelnuts, peanuts or almonds by adding thereto at least one compound of the group consisting of A and B, A compounds being represented by the formula

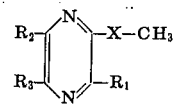

wherein X represents a member selected from the group consisting of oxygen and sulfur and one of the symbols $R_1$, $R_2$ and $R_3$ represents a methyl radical, the other two representing hydrogen; B compound being 2-ethoxy-3-methyl-pyrazine.

PYRAZINE DERIVATIVES AS NUTLIKE FLAVORING AGENTS AND METHOD OF USE

CROSS-REFERENCE TO RELATED APPLICATIONS

This application is a continuation-in-part of application Ser. No. 661,485, filed June 26, 1967, now abandoned which application, in turn, is a divisional application of application Ser. No. 346,420, filed Feb. 21, 1964, now U.S. Pat. No. 3,382,402, issued June 27, 1967.

BACKGROUND OF THE INVENTION

The present invention relates to new pyrazine derivatives which are useful as flavoring agents for modifying or improving the flavor and taste of foodstuffs, beverages and pharmaceutical preparations. The invention also relates to flavoring agents including said new pyrazine derivatives as well as to foodstuffs and beverages flavored by means of said derivatives.

SUMMARY OF THE INVENTION

The compounds of this invention which are incorporated into foodstuffs (including beverages and pharmaceutical preparations) correspond to the general formula

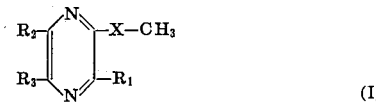

(I)

wherein X represents a member from the group consisting of oxygen and sulfur and one of the symbols $R_1$, $R_2$ and $R_3$ represents a methyl radical, the other two representing hydrogen. Also, 2Ethoxy-3-methyl-pyrazine can be used.

I have found that the compounds of formula (I), and 2-ethoxy-3-methyl-pyrazine, are valuable flavoring agents which have an unusually high flavoring power and which, if incorporated in minute amounts in foodstuffs and beverages, will impart to the latter a very fine flavor and taste of roasted hazelnuts, peanuts or almonds. This flavoring effect was very surprising since in pure or concentrated form the new pyrazine derivatives had a definitely unpleasant aggressive basic odor and a revolting metallic taste which by no means suggested the utility of these compounds and flavoring agents. It is only at extreme dilution that the compounds of formula (I), and 2-ethoxy3-methyl-pyrazine develop a fine odor and flavor.

DESCRIPTION OF THE PREFERRED EMBODIMENTS

The pyrazine derivatives of formula (I) in which X is oxygen are obtained by methods known per se, e.g. by treating halogenated methylpyrazines of the formula

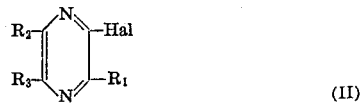

(II)

wherein Hal represents a halogen such as chloride or bromine, and one of the symbols $R_1$, $R_2$ and $R_3$ represents a methyl radical, the other two representing hydrogen, with an alkali metal methoxide such as sodium or potassium methoxide, or with powdered potassium hydroxide in methanol.

In an analogous manner, the pyrazine derivatives of formula (I) in which X is sulfur are prepared by treating methylpyrazines of formula (II) with an alkali metal methylmercaptide, e.g., sodium methylmercaptide.

The halogenated methylpyrazines used as starting materials can be prepared by known methods, e.g., by treating methylpyrazine with hydrogen peroxide according to C. F. Koelsch and W. H. Gumprecht [J. Org. Chem. 23, 1603 (1958)] and by reacting the resulting mixture of N-oxides with a phosphorus oxyhalide such as phosphorus oxychloride. This synthesis can be illustrated by the following reaction scheme:

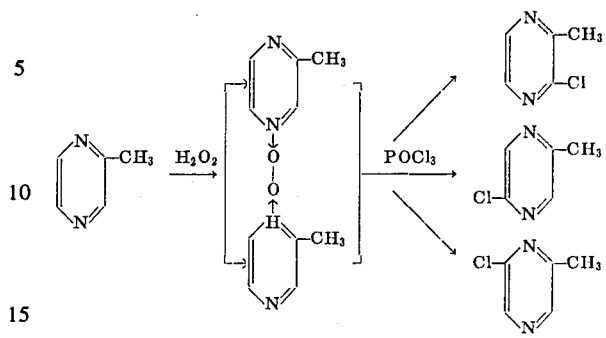

In this method a mixture of the three possible isomers of monochlorinated methylpyrazine is obtained. The treatment of this mixture with alkali metal methoxide and alkali metal methylmercaptide will also result in the formation of a mixture including the three possible isomers of methyl-methoxypyrazine or methyl- methylmercapto-pyrazine, respectively.*

According to another method the halogenated methylpyrazines used as starting materials are prepared by direct halogenation of methylpyrazine with free halogen, e.g. with chlorine in carbon tetrachloride [cf. A. Hirschberg and P.E. spoerri, J. Org. Chem. 26, 2356 (1961)]. Again, there is obtained a mixture of the three isomers of monohalogenated methylpyrazine which, upon treatment with alkali metal methoxide or alkali metal methylmercaptide, will yield a mixture of the three possible isomers of methyl-methoxy-pyrazine or methyl-methylmercapto-pyrazine, respectively.*

The pyrazine derivatives of formula (I) have very interesting flavoring properties and are useful for flavoring foodstuffs, beverages and pharmaceutical preparations, or for changing, improving or masking the inherent taste of these goods. Depending on the desired flavor note to be obtained the pyrazine derivatives can be incorporated in the said goods either as such or together with other flavoring ingredients. Since the pyrazines of this invention possess an exceptionally high flavoring power, minute amounts thereof are sufficient for producing the desired flavoring effects. As an illustrative example, the new pyrazine derivatives can be used in amounts as low as 10 to 20 mg. for 100 kg. of the material to be flavored. However, depending on the nature of the goods to be flavored it can be advantageous to use higher proportions of the compounds of this invention, e.g. up to 200 mg. for 100 kg. of the goods to be flavored. Amounts of more than 200 mg. will normally tend to develop and objectionable off-flavor.

The pyrazine derivatives are conveniently used in the form of dilute solutions in nontoxic edible solvents or diluents, e.g. 1 to 10 percent solutions, in order to achieve a uniform distribution in the goods to be flavored. Solvents or diluents which are suitable for this purpose include propylene glycol, triacetin, benzyl alcohol, practically

---

* These mixtures contain about 70 to 80 percent by weight of the isomer in which the pyrazine nucleus is substituted in the positions 2 and 3, the remaining 20 to 30 percent of the mixture consisting of the other two possible isomers. tasteless oils, such as peanut oil, and the like. Flavoring agents comprising at least one pyrazine derivative of formula (I) and a diluent are also part of the present invention.

The pyrazine derivatives of this invention can be used in the manufacture of or for flavoring a wide variety of foodstuffs and beverages such as chocolate, ice cream, puddings, bakery products, confectionery, milk products such as yogurt, edible fats, milk, creams, and the like.

It is also possible to incorporate the pyrazine derivatives in pharmaceutical preparations which are to be taken orally.

The pyrazine derivatives of this invention can moreover be processed together with other flavoring substances into flavor essences which can be used as such or after dilution, e.g. in the solvents mentioned above. The invention also relates to these concentrated or diluted essences.

Foodstuffs and beverages having incorporated therein pyrazine derivatives of this invention have a flavor and taste resembling very closely the natural flavor and taste of roasted hazelnuts, peanuts or almonds.

The invention is further illustrated in the following examples without being limited thereto.

EXAMPLE 1

60 g. of 30 perhydrol (0.53 mole) are dropped with stirring into a solution of 50 g. (0.53 mole) of 2-methyl-pyrazine in 600 ml. of glacial acetic acid at a temperature of 70°–80° C. The reaction mixture is maintained for 10 hours at 70°–80° C. and then concentrated to dryness in vacuo. The residue is taken up in 100 ml. of water, and the solution is again concentrated to dryness. The residue is directly distilled in vacuo. The main fraction distills over at 80°–115° C./8 Torr and crystallizes. There are thus obtained 44 g. of a product consisting of a mixture of N-oxides of 2-methyl-pyrazine.

250 ml. of phosphorus oxychloride are placed in a three-necked flask equipped with a stirrer and a thermometer. The contents of the flask is cooled to 10° C., and the 44 g. of N-oxide mixture obtained in the manner described above are added portionwise. Cooling is then interrupted. The temperature of the reaction mixture slowly rise to 50° C. The reaction mixture is then refluxed for a further 15 minutes and hereafter concentrated in vacuo. The residue is poured onto ice, neutralized with solid sodium carbonate and extracted with chloroform. The residue obtained by evaporating the chloroform is distilled in vacuo. About 17 g. of a fraction distilling over at 53°–54° C/10 Torr are collected. This fraction consists of a mixture of the three isomeric 2-methyl-chloro-pyrazines.

The product is dissolved in 25 ml. of methanol, and the solution is added to a sodium methoxide solution prepared from 6 g. of sodium and 150 ml. of methanol. The reaction solution is refluxed for 2 hours. The precipitated sodium chloride is removed by filtration. After removal of the methanol by distillation the residue is taken up in 100 ml. of water. The solution is extracted four times with ether, and the residue obtained by evaporation of the ether from the combined extracts is distilled. The fraction distilling at 48°–50° C./15 Torr is a mixture consisting of about 75 percent of 2-methyl-3-methoxy-pyrazine and about 25 percent of 2-methyl-5- and -6-methoxy-pyrazines (the percents being by weight). Yield: 8 g.

The analytical data of this fraction are as follows:
calculated for $C_8H_8N_2O$: C 58.05% H 6.50 %
found C57.86% H 6.54 %
Physical properties: $n_D^{23}$=1.5055; $d_4^{23}$=1.082.

A sample of the mixture of isomers was subjected to gas-chromatographic separation (column with silicone oil, 40 percent on Celite; temperature: 200° C.). The retention times (referred to methyl pyrazine: $T_R$=1.00) were $T_R$=1.48 for 2-methyl-3methoxy-pyrazine and $T_R$=1.56 for the mixture of 2-methyl-5- and-6-methoxy-pyrazines. It was not possible to separate the two last-mentioned pyrazines.

The IR spectra of the substituted pyrazines showed the following main vibrations:

2-methyl-3-methoxy-pyrazine: 3,480 (w), 2,970 (m), 1,585 (m), 1,550 (s), 1,488 (s), 1,385 (s), 1,340 (s), 1,296 (s), 1,172 (s), 1,010 (s), 976 (s), 872 (m), 837 (s), 767 (w), 751 (w), cm$^{-1}$. Mixture of 2-methyl-5- and -6-methoxy-pyrazines: 3,480(W), 2.975 (m) 1,594 (m), 1,535 (s), 1,433 (s), 1,394 (s), 1,316 (s), 1,255 (s), 1,198 (s), 1,182 (s), 1,141 (s), 1038 (s), 992 (s), 857 (s), 748 (m), 704 (m) cm.$^{-1}$.

It is not possible to separate the individual isomeric pyrazines from their mixture on an industrial scale by the usual physical methods. Therefore, the isomer mixture was used as such as a flavoring agent.

EXAMPLE 2

A solution of 9.6 g. of methylmercaptan in 40 ml. of ethanol is added to sodium ethoxide solution prepared from 4.6 g. of sodium and 250 ml. of ethanol. Into the resulting mixture there are introduced, while stirring vigorously, 25.7 g. of a mixture of isomeric monochlorinated methylpyrazines prepared as described in example 1. After the exothermic reaction has subsided, the reaction mixture is refluxed for 3 hours. The NaCl which has precipitated is filtered off, and the filtrate is concentrated. The residue is then distilled. There are obtained 21.4 g. of a fraction distilling at 84°–88° C./10 Torr. This fraction is a mixture containing about 70 percent by weight of 2-methyl-3-methylmercapto-pyrazine, the balance consisting of 2-methyl-5- and -6-methylmercaptopyrazines, as determined by gas chromatography. The analytical data of the mixture are as follows: Calculated for $C_6H_8N_2S$: C 51.40% H 5.75%
found: C 51.05% H 5.93%
Physical properties: $n_D^{20}$=1.5818; $n_4^{20}20/$=1.444.

It is not possible to separate the individual isomeric pyrazines from their mixture on a commercial scale by means of the usual physical methods. Therefore, the mixture is used as such for flavoring purposes.

EXAMPLE 3

A fondant mess was prepared by boiling for a short time a mixture of 1 kg. of ordinary sugar, 40 g. of flucose and 500 g. of water. Before the mass solidified, 0.07 g. of a 0.1 percent solution of the mixture of isomeric methyl-methoxy-pyrazines obtained according to example 1 in triacetin was incorporated in 100 g. of the said mass. Another 100 g. portion of the fondant mass was used as an unflavored reference sample.

The flavored fondant mass was subjected to an organoleptic comparison with the unflavored fondant mass. The fondant mass containing the pyrazine additive differed from the additive-free fondant mass by its pleasant strong taste of roasted almonds.

Substantially, the same flavoring effects were obtained by using the same proportion of the product prepared according to example 2.

EXAMPLE 4

An ice cream mass was prepared from 1 liter of milk, the yolk of 5 eggs and 250 g. of fine sugar by first stirring the yolk and sugar together and adding the mixture to the boiling milk. To a portion of the resulting cooled mass there was added a 0.1 percent solution of a mixture of isomeric methyl-methoxy-pyrazines prepared as described in example 1 in triacetin in the proportion of 0.8 g. of solution per 1 kg. of mass. Another portion of the unflavored mass was used as a reference sample. The two portions were processed to ice cream in the usual manner in an ice cream machine.

When tasting and comparing the obtained two ice cream samples it was found that the pyrazine-containing ice cream differed from the additive-free ice cream by having a strong and fine flavor of roasted hazelnuts.

Substantially the same flavoring effects were obtained by using the same proportion of the product obtained according to example 2.

EXAMPLE 5

A milk pudding liquid was prepared by mixing 25 g. of starch, 74 g. of glucose and 1 g. of salt with 600 ml. of milk and boiling the mixture. To the resulting liquid there was added a 0.1 percent solution of a mixture of isomeric methyl-methoxy-pyrazines prepared according to example 1 in triacetin in the proportion of 0.8 g. of solution per 1 kg. of pudding liquid. After solidifying the resulting pudding had a powerful taste of natural roasted hazelnuts.

The pyrazine derivatives of this invention can also be used together with other flavoring ingredients as shown in the following example.

EXAMPLE 6

20 parts by weight of maltol, 2.5 by weight of γ-nonalactone, 2.5 parts by weight of benzaldehyde, 25 parts by weight of acetylpropionyl and 10 parts by weight of a mixture of isomeric methyl-methylmercapto-pyrazines prepared according to example 2 are mixed with 140 parts by weight of benzyl alcohol and 800 parts by weight of triacetin. There is thus obtained a flavoring agent which is capable of imparting to foodstuffs a very fine a well-balanced hazelnut flavor which has a slightly weaker note of roasted nuts than in the case where the pyrazine derivatives are used without the additional flavoring ingredients.

EXAMPLE 7

2-ethoxy-3-methyl-pyrazine was prepared as follows: A solution of 30 g. of 2-chloro-3-methyl-pyrazine [prepared by the method described by Hirschberg et al. in J. Org. Chem. 26, page 2,358, column 2, paragraph B (1961); b.p.=56°–58° C./10 mm.] in 40 ml. of ethanol was added to a solution of 10.6 g. (0.46 mole) of sodium in 250 ml. of ethanol. The resulting solution was boiled for 2 hours. Then the ethanol was removed by distillation, the residue was diluted with 100 ml. of water, and the solution was extracted 3 times with ether. The combined ethereal extracts were washed with water, dried and distilled under reduced pressure. There were obtained 20 g. of a colorless oil having the following physical properties: b.p.=60°–62° C./10 mm. Hg; $n_D^{23}$=1.4942; $d_4^{23}$=1.035.

Organoleptic tests were conducted essentially in accordance with the methods set forth in examples 3 to 5 above. The beverages and the foodstuffs used for carrying out the tests were prepared as follows:

A. Ice cream—1 liter of milk was heated. 250 g. of castor sugar and 5 egg yolks were blended, and the heated milk was added to the blend. The mixture was stirred until it was smooth and then gently heated and stirred until it thickened and adhered to the spatula used for stirring. Heating was then immediately interrupted, and the mass was strained and allowed to cool. After addition of the flavor (i.e., the 2-ethoxy-3-methyl-pyrazine) the ice cream was finished in the freezer.

B. Fondants—1 kg. of lump sugar, 40 g. of glucose and 500 ml. of water were rapidly heated together to about 116° C. The resulting syrup was poured onto a marble slab which had previously been sprinkled with cold water. After cooling, the sugar mass was worked with a metal spatula by bringing the mass from the edges of the slab to the middle. The sugar mass became then firm and tough. It slowly crystallized and became white. After working for about 20 minutes, the sugar mass became suddenly firm. Further working for a few minutes resulted in the formation of a soft and supple mass which was allowed to stand for 24 hours before the flavor (i.e., the 2-ethoxy-3-methyl-pyrazine) was worked in.

C. Milk pudding—A mixture of 25 g. of starch, 74 g. of icing sugar and 1 g. of salt was blended with 600 ml. of milk to form a smooth paste which was then heated to the boiling point. After removal of the source of heat the flavor (i.e., the 2-ethoxy-3-methyl-pyrazine) was worked into the mass.

The 2-ethoxy-3-methyl-pyrazine was used in a concentration of 0.5 to 1 part per million, based on the weight of the finished foodstuffs.

After the 2-ethoxy-3-methyl-pyrazine was incorporated at the concentration set forth above in samples of the foodstuffs A, B, and C, the foodstuffs were submitted to the tasters for evaluation. The 2-ethoxy-3-methyl-pyrazine was found to have flavoring properties comparable with those of 2-methyl-3(5,6)-methoxy-pyrazine.

I claim:

1. A flavoring agent for imparting to foodstuffs and beverages a flavor similar to that of roasted hazelnuts, peanuts or almonds which comprises, in combination with a nontoxic diluent suitable for human consumption, at least one compound of the group consisting of A and B, said A compounds being represented by the formula

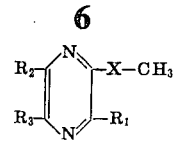

wherein X represents a member selected from the group consisting of oxygen and sulfur and one of the symbols $R_1$, $R_2$ and $R_3$ represents a methyl radical, the other two representing hydrogen, said B compound being 2-ethoxy-3-methyl-pyrazine.

2. A flavoring agent for imparting to foodstuffs and beverages a flavor similar to that of roasted hazelnuts, peanuts or almonds which comprises at least one compound represented by the general formula

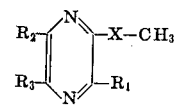

wherein X represents a member selected from the group consisting of oxygen and sulfur and one of the symbols $R_1$, $R_2$ and $R_3$ represents a methyl radical, the other two representing hydrogen, in combination with a nontoxic diluent suitable for human consumption.

3. A flavoring agent according to claim 2 which comprises a mixture of about 70 to 80 percent by weight of 2-methyl-3-methoxy-pyrazine and about 20 to 30 percent of at least one of the compounds 2-methyl-5-methoxy-pyrazine and 2-methyl-6-methoxy-pyrazine, this mixture being diluted in said diluent.

4. A flavoring agent according to claim 2 which comprises a mixture of about 70 to 80 percent by weight of 2-methyl-3-methylmercapto-pyrazine and about 20 to 30 percent of at least one of the compounds 2-methyl-5-methylmercapto-pyrazine and 2-methyl-6-methylmercapto-pyrazine, the mixture being diluted in said diluent.

5. A method for imparting to foodstuffs and beverages a flavor similar to that of roasted hazelnuts, peanuts or almonds which comprises incorporating in said foodstuffs and beverages a minor amount of a flavoring agent sufficient to impart to said foodstuffs and beverages a flavor and taste similar to those of roasted hazelnuts, peanuts or almonds, said flavoring agent including at least one compound of the group consisting of A and B, said A compounds being represented by the formula

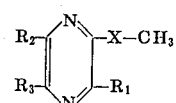

wherein X represents a member selected from the group consisting of oxygen and sulfur and one of the symbols $R_1$, $R_2$ and $R_3$ represents a methyl radical, the other two representing hydrogen, and said B compound being 2-ethoxy-3-methyl-pyrazine.

6. A method for imparting to foodstuffs and beverages a flavor similar to that of roasted hazelnuts peanuts or almonds which comprises incorporating in said foodstuffs and beverages a minor amount of a flavoring agent sufficient to impart to said foodstuffs and beverages a flavor and taste similar to those of roasted hazelnuts, peanuts or almonds, said flavoring agent including at least one compound represented by the formula

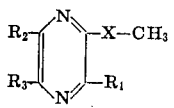

wherein X represents a member selected from the group consisting of oxygen and sulfur and one of the symbols $R_1$, $R_2$ and $R_3$ represents a methyl radical, the other two representing hydrogen.

7. A method according to claim 6 in which said flavoring agent comprises a mixture of about 70 to 80 percent by weight of 2-methyl-3-methoxy-pyrazine and about 20 to 30 percent of at least one of the compounds 2-methyl-5-methoxy-pyrazine and 2-methyl-6-methoxy-pyrazine.

8. A method according to claim 6 in which said flavoring agent comprises a mixture of about 70 to 80 percent by weight of 2-methyl-3-methylmercapto-pyrazine and about 20 to 30 percent of at least one of the compounds 2-methyl-5-methylmercapto-pyrazine and 2-methyl-6-methylmercapto-pyrazine.

9. A foodstuff having the flavor and taste of roasted hazelnuts, peanuts or almonds which has incorporated therein minor amounts of a flavoring agent sufficient to impart to said foodstuff a flavor and taste similar to those of roasted hazelnuts, peanuts or almonds, said flavoring agent including at least one compound of the group consisting of A AND B, said A compounds being represented by the formula

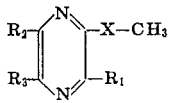

wherein X represents a member selected from the group consisting of oxygen and sulfur and one of the symbols $R_1$, $R_2$ and $R_3$ represents a methyl radical, the other two representing hydrogen, said B compound being 2-ethoxy-3-methyl-pyrazine.

10. A foodstuff having the flavor and taste of roasted hazelnuts, peanuts or almonds which has incorporated therein minor amounts of a flavoring agent sufficient to impart to said foodstuff a flavor and taste similar to those of roasted hazelnuts, peanuts or almonds, said flavoring agent including at least one compound represented by the formula

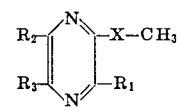

wherein X represents a member selected from the group consisting of oxygen and sulfur and one of the symbols $R_1$, $R_2$ and $R_3$ represents a methyl radical, the other two representing hydrogen.

11. A foodstuff according to claim 10 in which said flavoring agent includes about 70 to 80 percent by weight of 2-methyl-3-methoxy-pyrazine and about 20 to 30 percent of at least one of the compounds 2-methyl-5-methoxy-pyrazine and 2-methyl-6-methoxy-pyrazine.

12. A foodstuff according to claim 10 in which said flavoring agent includes about 70 to 80 percent by weight of 2-methyl-3-methylmercapto-pyrazine and about 20 to 30 percent of at least one of the compounds 2-methyl-5-methylmercapto-pyrazine and 2-methyl-6-methymercapto-pyrazine.

13. A beverage having the flavor and taste of roasted hazelnuts, peanuts or almonds which has incorporated therein minor amounts of a flavoring agent sufficient to impart to said foodstuff a flavor and taste similar to those of roasted hazelnuts, peanuts or almonds, said flavoring agent including at least one compound of the group consisting of A and B, said A compounds being represented by the formula

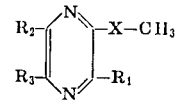

wherein X represents a member selected from the group consisting of oxygen and sulfur and one of the symbols $R_1$, $R_2$ and $R_3$ represents a methyl radical, the other two representing hydrogen, said B compound being 2-ethoxy-3-methyl-pyrazine.

14. A beverage having the flavor and taste of roasted hazelnuts, peanuts or almonds which has incorporated therein minor amounts of a flavoring agent sufficient to impart to said foodstuff a flavor and taste similar to those of roasted hazelnuts, peanuts or almonds, said flavoring agent including at least one compound represented by the formula

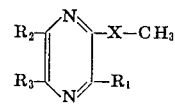

wherein X represents a member selected from the group consisting of oxygen and sulfur and one of the symbols $R_1$, $R_2$ and $R_3$ represents a methyl radical, the other two representing hydrogen.

15. A beverage according to claim 14 in which said flavoring agent includes about 70 to 80 percent by weight of 2-methyl-3-methoxy-pyrazine and about 20 to 30 percent of at least one of the compounds 2-methyl-5-methoxy-pyrazine and 2-methyl-6-methoxy-pyrazine.

16. A beverage according to claim 14 in which said flavoring agent includes about 70 to 80 percent by weight of 2-methyl-3-methylmercapto-pyrazine and about 20 to 30 percent of at least one of the compounds 2-methyl-5-methylmercapto-pyrazine and 2-methyl-6-methylmercapto-pyrazine.

17. A flavoring agent according to claim 1 in which the compound is 2-ethoxy-3-methyl-pyrazine.

18. The method of claim 5 in which the compound is 2-ethoxy-3-methyl-pyrazine.

19. The foodstuff of claim 9 in which the compound is 2-ethoxy-3-methyl-pyrazine.

20. The beverage of claim 13 in which the compounds is 2-ethoxy-3-methyl-pyrazine.

* * * * *

UNITED STATES PATENT OFFICE
CERTIFICATE OF CORRECTION

Patent No. 3,622,346                    Dated November 23, 1971

Inventor(s) MAX WINTER

It is certified that error appears in the above-identified patent and that said Letters Patent are hereby corrected as shown below:

Column 1, line 10, "Pat. No. 3,382,402" should read
--Pat. No. 3,328,402--.

Column 2, line 10    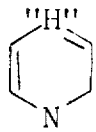    should read    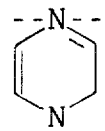

Column 2, lines 55 to 76 should read as follows:

"Solvents or diluents which are suitable for this purpose include propylene glycol, triacetin, benzyl alcohol, practically tasteless oils, such as peanut oil, and the like. Flavoring agents comprising at least one pyrazine derivative of formula (I) and a diluent are also part of the present invention.

The pyrazine derivatives of this invention can be used in the manufacture of or for flavoring a wide variety of foodstuffs and beverages such as chocolate, ice cream, puddings, bakery products, confectionery, milk products such as yogurt, edible fats, milk, creams, and the like.

It is also possible to incorporate the pyrazine derivatives in pharmaceutical preparations which are to be taken orally.

The pyrazine derivatives of this invention can moreover be processed together with other flavoring substances into flavor essences which can be used as such or after dilution, e.g. in the solvents mentioned above. The invention also relates to these concentrated or diluted essences.

Foodstuffs and beverages having incorporated therein pyrazine derivatives of this invention have a flavor and taste"

*These mixtures contain about 70 to 80 percent by weight of the isomer in which the pyrazine nucleus is substituted in the positions 2 and 3, the remaining 20 to 30 percent of the mixture consisting of the other two possible isomers."

Column 3, line 62, "CM$'7E'1$" should read --CM$^{-1}$--.

UNITED STATES PATENT OFFICE
CERTIFICATE OF CORRECTION CONTINUED

Patent No. 3,622,346   Dated November 23, 1971

Inventor(s) MAX WINTER   PAGE - 2

It is certified that error appears in the above-identified patent and that said Letters Patent are hereby corrected as shown below:

Column 3, line 66, "$cm'^{7E'}$" should read --$cm^{-1}$--.

Column 4, line 17, "$n_4^{20}20/=1.444.$" should read --$n_4^{20}=1.1444.$--.

Column 4, line 25, "40 g. of flucose" should read --40 g. of glucose--.

Column 7, line 26, "consisting of A AND B" should read --consisting of A and B--.

Signed and sealed this 16th day of May 1972.

(SEAL)
Attest:

EDWARD M. FLETCHER, JR.   ROBERT GOTTSCHALK
Attesting Officer   Commissioner of Patents